(12) United States Patent
Nam et al.

(10) Patent No.: US 10,343,221 B2
(45) Date of Patent: Jul. 9, 2019

(54) CUTTING INSERT AND CUTTING TOOL HAVING THE SAME

(71) Applicant: KORLOY INC., Seoul (KR)

(72) Inventors: Ki-Chan Nam, Cheongju-si (KR); Young-Heum Kim, Cheongju-si (KR); Hyo-San Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 184 days.

(21) Appl. No.: 15/323,404

(22) PCT Filed: Apr. 24, 2015

(86) PCT No.: PCT/KR2015/004103
§ 371 (c)(1),
(2) Date: Dec. 30, 2016

(87) PCT Pub. No.: WO2016/006807
PCT Pub. Date: Jan. 14, 2016

(65) Prior Publication Data
US 2017/0144228 A1    May 25, 2017

(30) Foreign Application Priority Data
Jul. 8, 2014 (KR) .......................... 10-2014-0085122

(51) Int. Cl.
*B23B 27/02* (2006.01)
*B23B 27/16* (2006.01)
*B23C 5/20* (2006.01)

(52) U.S. Cl.
CPC .............. *B23B 27/02* (2013.01); *B23B 27/16* (2013.01); *B23C 5/20* (2013.01); *B23C 5/207* (2013.01);
(Continued)

(58) Field of Classification Search
CPC ... B23C 2200/0494; B23C 5/20; B23C 5/207; B23C 2200/125; B23C 2200/126;
(Continued)

(56) References Cited

U.S. PATENT DOCUMENTS 5,052,863 A * 10/1991 Satran ................... B23B 51/048
407/113
5,207,538 A * 5/1993 Satran ................... B23C 5/2213
407/113
(Continued)

FOREIGN PATENT DOCUMENTS

KR    10-2005-0062699 A    6/2005
KR    10-2008-0061632 A    7/2008
(Continued)

*Primary Examiner* — Sara Addisu
(74) *Attorney, Agent, or Firm* — Rabin & Berdo, P.C.

(57) ABSTRACT

A cutting insert and a cutting tool having same. The cutting insert includes: an upper surface; a lower surface having a flat surface; a fastening hole penetrating the upper surface and the lower surface; side surfaces each connecting to the upper surface and the lower surface; and cutting edges formed by the upper surface and the side surfaces. A first cutting edge is inclined downward. A major side surface comprises a first major side surface connected to the upper surface so as to constitute the first cutting edge, and a second major side surface connected to the first major side surface and the lower surface. A minor side surface comprises a first minor side surface connected to the upper surface so as to constitute a second cutting edge, and a third minor side surface connected to the upper surface and the lower surface.

19 Claims, 8 Drawing Sheets

(52) U.S. Cl.
CPC ............... *B23C 2200/0494* (2013.01); *B23C 2200/125* (2013.01); *B23C 2200/286* (2013.01); *B23C 2210/045* (2013.01)

(58) Field of Classification Search
CPC ........ B23C 2200/286; B23C 2210/045; B23B 27/02; B23B 27/16
See application file for complete search history.

(56) References Cited

U.S. PATENT DOCUMENTS

| | | | | |
|---|---|---|---|---|
| 5,383,750 | A * | 1/1995 | Satran | B23C 5/1072 407/113 |
| 5,454,670 | A * | 10/1995 | Noda | B23C 5/006 407/114 |
| 5,593,255 | A * | 1/1997 | Satran | B23C 5/109 407/113 |
| 5,597,271 | A * | 1/1997 | Men | B23C 5/2213 407/113 |
| 5,810,519 | A * | 9/1998 | Vogel | B23C 5/109 407/114 |
| 6,142,716 | A * | 11/2000 | Jordberg | B23C 5/202 407/114 |
| 6,196,770 | B1 * | 3/2001 | Astrom | B23C 5/109 407/114 |
| 6,293,737 | B1 * | 9/2001 | Satran | B23C 5/2221 407/113 |
| 6,503,028 | B1 * | 1/2003 | Wallstrom | B23C 5/109 407/35 |
| 8,454,279 | B2 * | 6/2013 | Dufour | B23C 5/207 407/113 |
| 9,144,848 | B2 * | 9/2015 | Konta | B23C 5/109 |
| 9,475,135 | B2 * | 10/2016 | Wandeback | B23F 21/128 |
| 9,475,136 | B2 * | 10/2016 | Kovac | B23C 5/207 |
| 2004/0131431 | A1 * | 7/2004 | Satran | B23C 5/109 407/40 |
| 2004/0223818 | A1 * | 11/2004 | Sheffler | B23C 5/109 407/48 |
| 2008/0170916 | A1 * | 7/2008 | Ballas | B23C 5/109 407/42 |
| 2008/0260476 | A1 * | 10/2008 | Ishida | B23C 5/06 407/114 |
| 2010/0003090 | A1 * | 1/2010 | Johansson | B23C 5/202 407/113 |
| 2010/0054872 | A1 * | 3/2010 | Sung | B23B 27/1622 407/42 |
| 2013/0045061 | A1 * | 2/2013 | Ishi | B23C 5/109 409/132 |
| 2014/0298967 | A1 * | 10/2014 | Ishi | B23C 5/109 83/13 |
| 2015/0174664 | A1 * | 6/2015 | Nam | B23C 5/06 407/116 |
| 2016/0031020 | A1 * | 2/2016 | Francis | B23C 5/109 407/42 |
| 2016/0158854 | A1 * | 6/2016 | Ishi | B23C 5/207 409/131 |
| 2016/0167137 | A1 * | 6/2016 | Agic | B23B 27/1662 407/66 |
| 2016/0288225 | A1 * | 10/2016 | Lee | B23C 5/109 |
| 2017/0066065 | A1 * | 3/2017 | Burtscher | A61K 31/4741 |
| 2017/0113286 | A1 * | 4/2017 | Nam | B23C 5/207 |
| 2017/0157684 | A1 * | 6/2017 | Nam | B23C 5/207 |
| 2017/0197256 | A1 * | 7/2017 | Zhang | B23C 5/006 |
| 2017/0282262 | A1 * | 10/2017 | Burtscher | B23C 5/06 |
| 2017/0291231 | A1 * | 10/2017 | Mao | B23C 5/109 |
| 2018/0015554 | A1 * | 1/2018 | Roman | B23C 5/109 |

FOREIGN PATENT DOCUMENTS

| | | |
|---|---|---|
| KR | 10-0949660 B1 | 3/2010 |
| KR | 10-2011-0116406 A | 10/2011 |
| KR | 10 2013-0140326 A | 12/2013 |

* cited by examiner

CUTTING INSERT AND CUTTING TOOL HAVING THE SAME

TECHNICAL FIELD

The present disclosure relates to a cutting insert and a cutting tool having the same.

BACKGROUND ART

Generally, a cutting insert is fastened to a cutting tool mounted on a machine tool and used for cutting a workpiece that is generally formed of ferrous or nonferrous metals, non-metal material, and so on.

An example of such cutting insert is disclosed in Korean Registration Patent No. 10-0949660.

Figure 1:
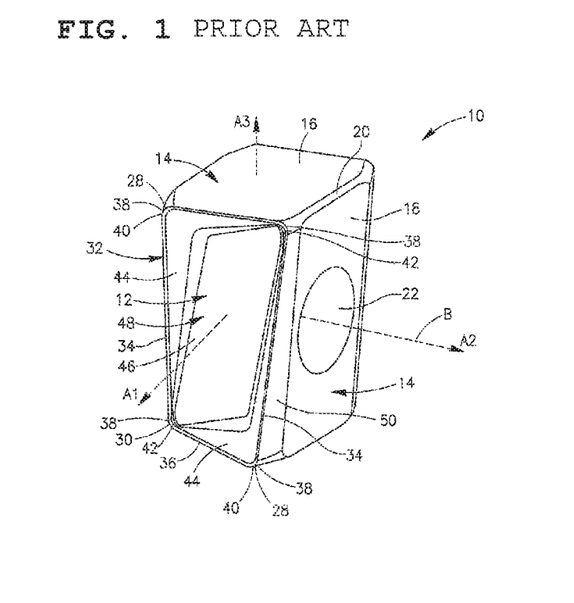
FIG. 1 is a perspective view of a related cutting insert.
Figure 2:
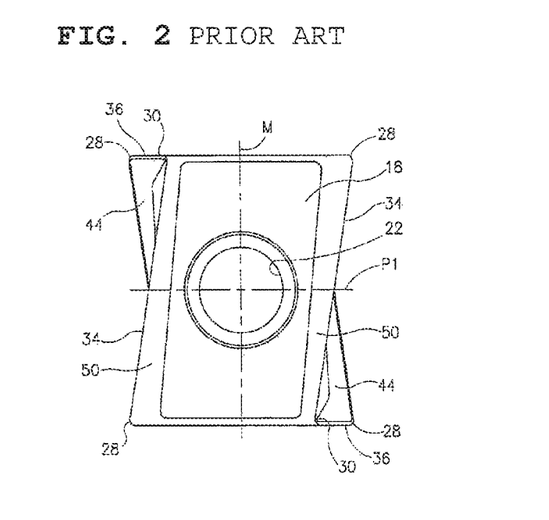
FIG. 2 is a side view of the cutting insert of FIG. 1.
Figure 3:
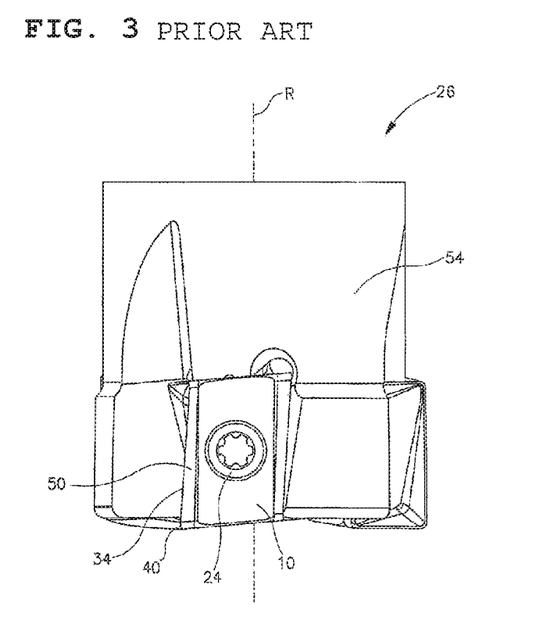
FIG. 3 is a side view of a milling cutter having the cutting insert of FIG. 1 mounted thereon.

Referring to FIGS. 1 to 3, a related cutting insert will be described. For reference, FIGS. 1 to 3 each correspond to FIGS. 1, 4 and 8 of KR10-00949660, and the same reference numerals are used for convenience of explanation. Further, the same names of the elements are used as used in KR10-00949660.

The related cutting insert is a double-sided cutting insert 10 for use with a milling cutter, in which outer peripheral surface 14 is extended between two opposed end surfaces 12 and includes two identical minor-side surfaces generally in a shape of parallelogram, two opposed identical major-side surfaces 18, and corner-side surface positioned between adjacent minor- and major-side surfaces 16, 18.

Meanwhile, the related cutting insert adopts double-sided type, and a side surface 18 is formed basically in a negative shape, so that it is difficult to provide more than a certain level of cutting performance. That is, as illustrated in FIG. 3, enhancement of cutting performance is limited, as there is limit to achieving a large axial rake angle of the major cutting edge 34.

Further, as illustrated in FIGS. 2 and 3, since the thickness of the insert (transversal thickness of the insert with reference to FIG. 2) is considerably increased, the number of inserts applicable for use with the milling cutter with the same machining diameter is limited and the machining productivity is limited.

Further, as seen in FIGS. 1 and 3, the entire minor-side surface 16 is formed as a negative surface. Accordingly, there is a problem in that, when the insert is set to ensure a sufficient clearance angle, the axial rake angle of the major cutting edge 34 decreases and the cutting performance is deteriorated.

Specifically, the related double-sided cutting insert uses a portion (i.e., inner end surface 46) of the end surfaces 12 (upper and lower surfaces) as a mounting surface, and uses the other as an inclined surface (i.e., rake surface 44) to discharge chips (see paragraphs [0044] and [0047] of KR10-00949660 for reference). Accordingly, the surface area of the mounting surface for mounting with the milling cutter body is narrow, and considerable problem occurs (e.g., breakage of the fastening screw passed through the cutting insert and fastened into the milling cutter body during high-speed high-stiffness machining, or generation of vibration during cutting process, or the like).

Further, when set in the cutter body such that the upper surface is used as the rake surface, the lower surface is used as the mounting surface. Alternatively, when the lower surface is used as the rake surface, the upper surface is used as the mounting surface. This relationship causes problem such as deteriorated performance due to limits to designing of rake surface for chip evacuation, designing of helix angles, and so on. Meanwhile, in an example of a flat-shaped insert in which a side surface is formed as a positive surface, since the side surface serving as the mounting surface is formed as a positive surface, constraining force is decreased after fastening with the cutter body, and problem of vibration occurs due to cutting impact during cutting process.

DISCLOSURE OF INVENTION

Technical Problem

An object of the present disclosure is to solve the problems mentioned above, and accordingly, it is an object of the present disclosure to provide a cutting insert capable of enhancing cutting characteristics and productivity, and a cutting tool having the same.

Further, although not explicitly described, the present disclosure includes other objects that can be derived from the configuration of the present disclosure.

Solution to Problem

In order to achieve the objects mentioned above, according to an exemplary embodiment of the present disclosure, a cutting insert may include an upper surface; a lower surface having a flat surface; a fastening hole penetrating the upper surface and the lower surface; side surfaces each connecting to the upper surface and the lower surface; and cutting edges formed by the upper surface and the side surfaces, in which a first cutting edge among the cutting edges may be inclined downward from one side to the other side, a major side surface among the side surfaces may include a first major side surface connected to the upper surface so as to constitute the first cutting edge, and a second major side surface connected to the first major side surface and the lower surface, in which the first major side surface may have a negative surface, and the second major side surface may have a positive surface, and a minor side surface among the side surfaces may include a first minor side surface connected to the upper surface so as to constitute a second cutting edge, and a third minor side surface connected to the upper surface and the lower surface, in which the first minor side surface may have a positive surface, and the third minor side surface may have a negative surface.

The minor side surface may further include a second minor side surface connected to the first minor side surface and the lower surface, and the second minor side surface may have a positive surface or a negative surface.

Further, an angle of inclination of the first cutting edge is between 3 degrees or more and 20 degrees or less.

Further, when the second minor side surface has the positive surface, the first minor side surface may be formed at a positive angle that is less than the positive angle of the first minor side surface.

Further, the first major side surface and the third minor side surface serve as a mounting surface when the cutting insert is mounted on a cutting tool.

Further, when seen on a plan view, the cutting insert has upper and lower portions divided into 180-degree rotational symmetry with reference to a center of the fastening hole by a first centerline passing through the center of the fastening hole in a transversal direction.

Further, when seen on a plan view, the cutting insert has left and right portions divided into 180-degree rotational symmetry with reference to a center of the fastening hole by a second centerline passing through the center of the fastening hole in a longitudinal direction.

Further, the one side is a high portion, and the other side is a low portion, and the upper surface is inclined from the high portion toward the fastening hole.

Further, the upper surface is composed of non-flat surface only.

A cutting tool mounted with the cutting insert according to an exemplary embodiment of the present disclosure is provided, in which the cutting tool is provided with a mounting sheet surface for mounting with the cutting insert, and the fastening sheet surface includes a first major side surface sheet surface, a third minor side surface sheet surface, and a lower surface sheet surface, each being in contact with, and having corresponding shapes to the first major side surface, the third minor side surface, and the lower surface.

Further, the first major side surface sheet surface, the third minor side surface sheet surface, and the lower surface sheet surface are flat surfaces.

EFFECTS OF INVENTION

With the configuration described above, the present disclosure can provide effects as follows.

The cutting insert according to the present disclosure can have a greater rake angle of the major cutting edge than that of the relate cutting insert. Accordingly, when the cutting insert is mounted on the cutting tool, greater axial rake angle than the related cutting insert can be ensured and as a result, cutting characteristic can be enhanced.

Further, by forming a negative surface for the first major side surface 41 as a mounting surface, mounting stability with the cutting tool can be increased, and by additionally forming a positive surface for the second major surface, interference with the workpiece during cutting process thereof can be minimized, and as a result, cutting performance can be enhanced.

Further, by forming the second minor side surface 52 as a separate positive surface for the minor side surfaces 5, cutting characteristic can be enhanced compared to the related cutting insert in which the entire minor-side surface 16 is formed as a negative surface.

Figure 4:
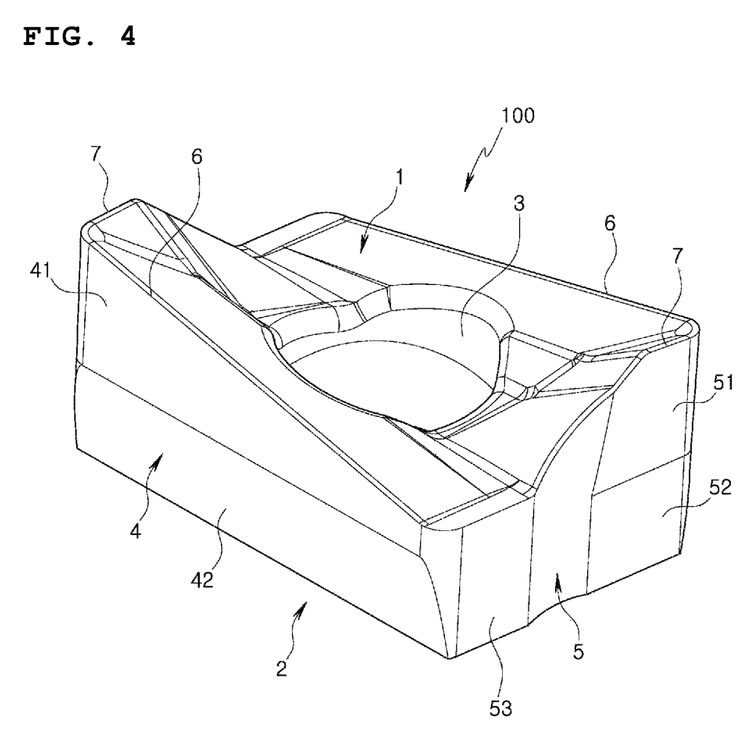
FIG. 4 is a perspective view of a cutting insert according to an exemplary embodiment of the present disclosure.

Further, compared to the related cutting insert (see FIG. 4), the thickness of the cutting insert can be relatively reduced such that the number of cutting inserts applicable for use with the milling cutter with the same machining diameter can be increased, and as a result, machining productivity can be enhanced.

Further, the effects of the present disclosure are not limited to those mentioned above, but include those that are derived from the detailed description of the present disclosure.

MODE FOR THE INVENTION

Hereinbelow, a cutting insert 100 (hereinbelow, the cutting insert') according to exemplary embodiments of the present disclosure will be described in detail with reference to accompanying drawings.

As illustrated in FIGS. 4 to 7, the cutting insert includes an upper surface 1, a lower surface 2 having flat surface, a fastening hole 3 penetrating the upper surface 1 and the lower surface 2, side surfaces 4, 5 each connected to the upper surface 1 and the lower surface 2, and cutting edges 6, 7 formed by the upper surface 1 and the side surfaces 4, 5.

As an example, when viewed in the plan view (i.e., FIG. 5), the cutting insert roughly has a rectangular shape, in which the side surfaces include two major side surfaces 4 and two minor side surfaces 5, and the cutting edges include two first cutting edges 6 (i.e., major cutting edges) and two second cutting edges 7 (i.e., minor cutting edges).

Figure 7:
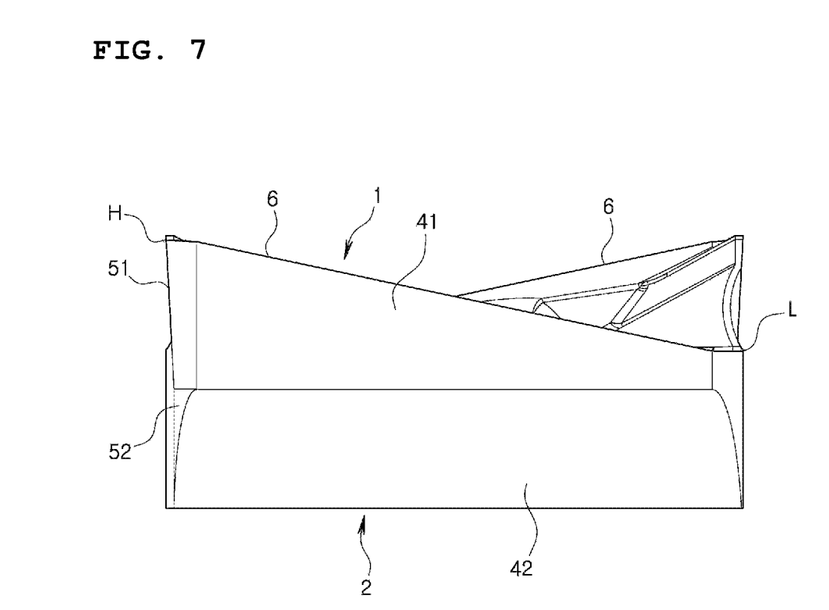
FIG. 7 is a front view of the cutting insert of FIG. 4.

As illustrated in FIG. 7, the first cutting edges 6 (i.e., peripheral cutting edges) are inclined downward from one side to the other side. The 'one side' herein corresponds to a high portion H, while the 'other side' herein corresponds to a low portion (L). For example, the inclined angle of the first cutting edges 6 may preferably be in a range of 3 and 20 degrees.

Figure 8:
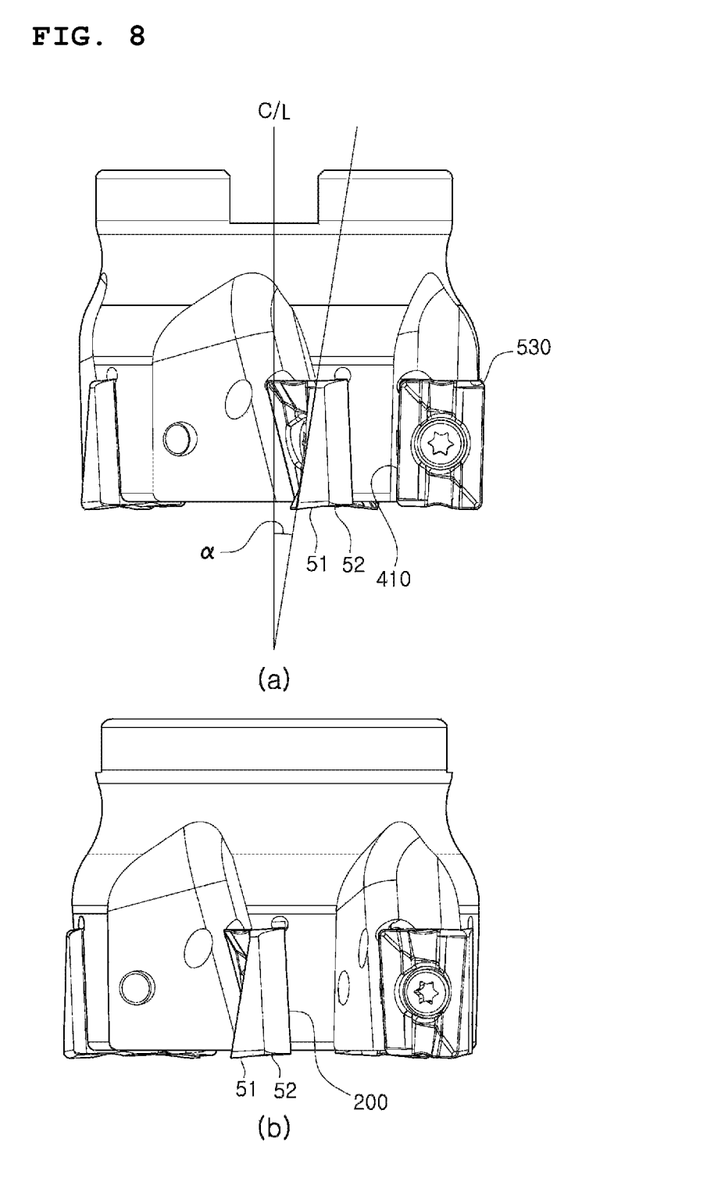
FIG. 8 is a side view of a cutting tool having the cutting insert of FIG. 4 mounted thereon.

The flat-shaped configuration of the cutting insert may provide a far greater rake angle of the major cutting edges 6 than the related cutting insert. That is, as illustrated in FIG. 8, cutting characteristic can be enhanced, because upon mounting of the cutting insert on the cutting tool, a far greater axial rake angle ($\alpha$) than the related cutting insert can be ensured.

As illustrated in FIG. 7, the major side surfaces 4 have a first major side surface 41 and a second major side surface 42.

The first major side surface 41 is connected to the upper surface 1 to form the first cutting edge 6. The second major side surface 42 is connected to the first major side surface 41 and the lower surface 2, respectively.

Figure 9:
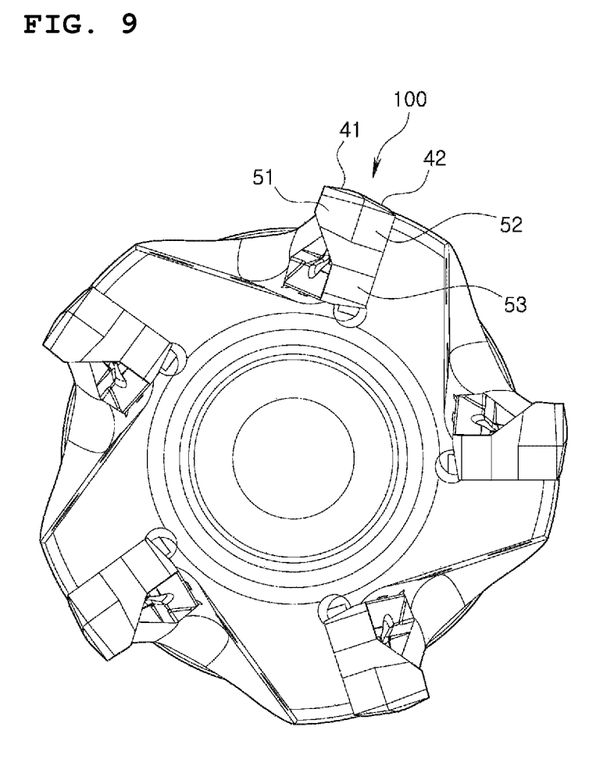
FIG. 9 is a bottom view of a cutting tool having the cutting insert of FIG. 4 mounted thereon.

The first major side surface 41 has a negative surface, and the second major side surface 42 has a positive surface. Upon mounting on the cutting tool, the first major side surface 41 serves as a mounting surface, and the second major side surface 42 is additionally configured as a positive surface rather than negative surface. Accordingly, as shown in FIG. 9, interference between the cutting insert and the workpiece as a subject of cutting process can be minimized, thus contributing to the enhancement of the cutting performance.

Meanwhile, a 'negative surface' as used herein generally refers to a surface that is perpendicular to an imaginary plane P (that is parallel to the lower surface 2 in the embodiment and) that perpendicularly intersects an imaginary line C3 that passes through a center of the fastening hole 3. A 'positive surface' refers to a non-perpendicular surface (see FIG. 6). Regarding the positive surface, the surface that is formed like the second minor side surface 52 (to be described) is referred to as a positive surface (or briefly, 'posi-surface'). A surface that is inclined reversely is referred to as a reversely positive surface.

Figure 6:
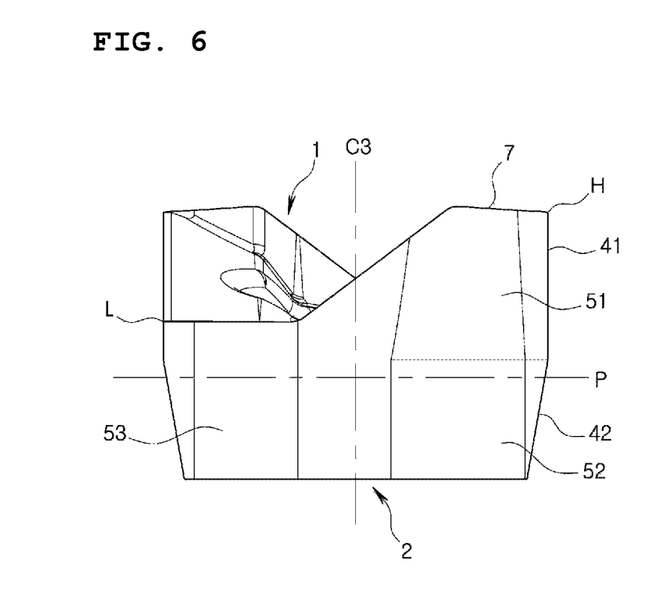
FIG. 6 is a right side view of the cutting insert of FIG. 4.

As illustrated in FIG. 6, the minor side surfaces 5 include a first side surface 51 connected to the upper surface 1 to form a second cutting edge 7 (or frontal cutting edge), and a third minor side surface 53 connected to the upper surface 1 and the lower surface 2. Further, the minor side surfaces 5 may additionally include a second minor side surface 52 connected to the first minor side surface 51 and the lower surface 2.

Meanwhile, the second cutting edge 7 may be parallel to the lower surface 2, or upwardly inclined to an imaginary line C3 that passes through the center of the fastening hole 3 such that the surface roughness of the machined surface of the workpiece can be enhanced.

In the above example, the first minor side surface 51 has a positive surface, the second minor side surface 52 has a positive or negative surface, and the third minor side surface 53 has a negative surface.

Meanwhile, when the second minor side surface 52 has a positive surface, the positive angle of the second minor side surface 52 is formed smaller than the positive angle of the first minor side surface 51. That is, as illustrated in FIG. 7, the second minor side surface 52 is formed such that it is more perpendicular to the lower surface 2 than the first minor side surface 51.

As described above, by providing the second minor side surface 51 for the second minor side surface 52 as a separate positive surface, cutting characteristics can be enhanced from the related cutting insert in which the entire minor-side surface 16 is formed as the negative surface.

Further, the lower surface 2 of the cutting insert, and the first major side surface 41 and the third minor side surface 53 serve as a mounting surface upon fastening with the cutting tool (milling cutter) which will be described below. Accordingly, unlike the related cutting insert, the negative surface 53 is separately provided for the minor side surface 5. Accordingly, compared to when the mounting surface is a positive surface upon fastening with the cutting tool, mounting characteristic is enhanced.

Figure 5:
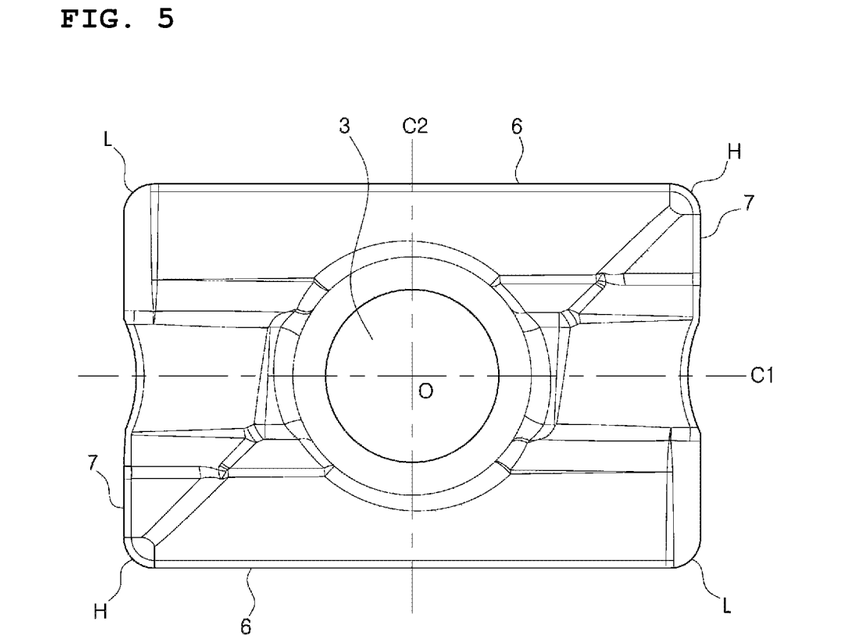
FIG. 5 is a plan view of the cutting insert of FIG. 4.

As illustrated in FIG. 5, when viewed in the plan view, the cutting insert according to the present disclosure has the upper and lower portions divided into 180-degree rotational symmetry with reference to the center O of the fastening hole 3 by the first centerline C1 passing through the center O of the fastening hole 3 in a transversal direction, and has left and right portions divided into 180-degree rotational symmetry with reference to the center O of the fastening hole 3 by the second centerline C2 passing through the fastening hole 3 in a longitudinal direction.

Further, the upper surface 1 of the cutting insert is inclined from the high portion H toward the fastening hole 3. This allows the cutting edge angle of the first and second cutting edges 6, 7 to be smaller than 90 degrees, and subsequently increased rake angle and cutting characteristics during actual cutting of the workpiece. Meanwhile, since the upper surface 1 of the cutting insert is not used as the mounting surface, it is not required to provide a flat surface (plane) during designing of the upper surface, and the upper surface can have non-flat surfaces (e.g., curved surfaces, etc.) only.

Further, as illustrated in FIGS. 5 and 8, compared to the related cutting insert (see FIG. 2), the cutting insert has a relatively shallow thickness. Accordingly, the number of cutting inserts applicable for milling cutter with the same machining diameter can be increased, and accordingly, machining productivity can be increased.

Hereinbelow, a cutting tool (milling cutter) mounted with the cutting insert described above will be described with reference to FIGS. 8 to 10. As an example, the cutting tool may be a milling cutter for perpendicular machining.

Figure 10:
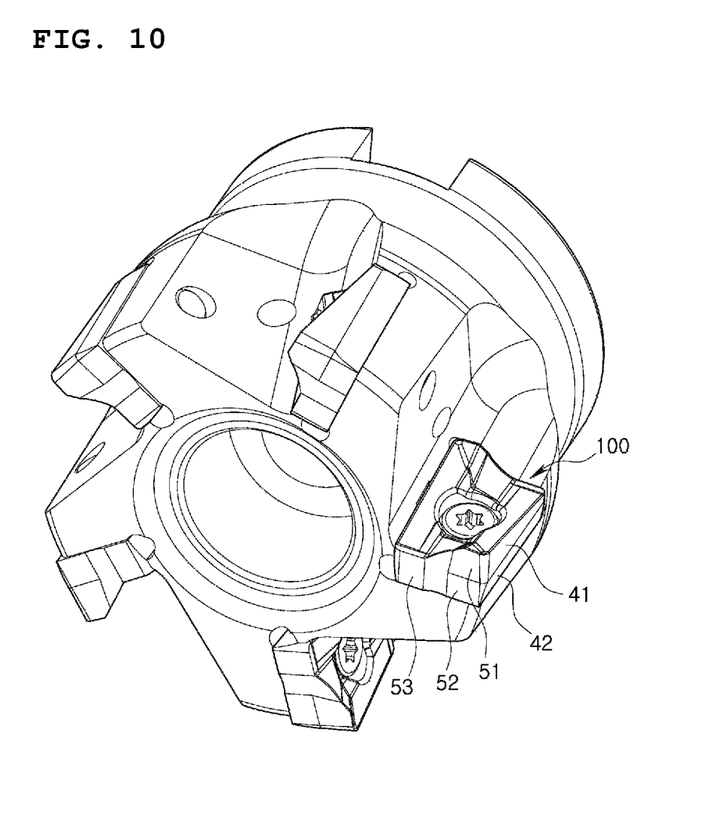
FIG. 10 is a perspective view of a cutting tool having the cutting insert of FIG. 4 mounted thereon.

The cutting tool is provided with a mounting sheet surface for fastening with the cutting insert.

Specifically, the mounting sheet surface includes a first major side surface sheet surface 410, a third minor side surface sheet surface 530, and a lower surface sheet surface 200.

These sheet surfaces, i.e., the first major side surface sheet surface 410, the third minor side surface sheet surface 530, and the lower surface sheet surface 200 are respectively in contact with, and thus have shapes corresponding to the first major side surface 41 that is a negative surface, the third minor side surface 53 that is a negative surface, and the lower surface 2 that is a flat surface in the cutting insert.

Accordingly, stable fastening is enabled, as the negative surface is formed on the first major side surface 41 that serves as the mounting surface among the major side surfaces 4. Further, the fastening stability with the cutting tool can be more reinforced, as the negative surface is likewise formed on the third minor side surface 53 that serves as the mounting surface among the minor side surfaces 5.

As described above, with the cutting insert, it is possible to originally separate the surface (lower surface) used as the mounting surface from the surface (upper surface) used as the rake surface for the purpose of chip evacuation. Accordingly, the problems associated with the related double-side type cutting insert, i.e., narrow area of the mounting surface for fastening with the cutter body, and subsequent damages that may occur during high-speed high-stiffness machining to the fastening screw that fastens the cutting insert to the milling cutter body, vibration during cutting process, and so on, can be resolved.

Further, since the flat-shaped, negative type cutting insert uses only the lower surface as the mounting surface, the upper surface is not limited to certain design in the designing of rake surface for chip evacuation, designing of helix angle, and so on. In addition, while a flat surface (plane) is generally used as the surface for fastening with the cutter body, the cutting insert uses only the lower surface as the mounting surface and does not use the upper surface as the mounting surface. Accordingly, it is not necessary to form flat surface when designing the upper surface, and the upper surface may be freely designed into non-flat surface (e.g., curved surface, etc.) only.

Further, unlike the flat-shaped insert in which the side surfaces have the positive surfaces, the side surface serving as the mounting surface forms a negative surface. Accordingly, it is thus possible to ensure stable constraining force for fastening with the cutter body, and the problem of vibration due to cutting impact during cutting process can also be minimized.

Further, since the lower surface has flat surface, the cutting insert is easy to manufacture and has high industrial applicability.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present disclosure is applicable in a cutting insert and a cutting tool having the cutting insert mounted thereon.

What is claimed is:

1. A cutting insert, comprising:
an upper surface; a lower surface having a flat surface; a fastening hole penetrating the upper surface and the lower surface; side surfaces each connecting to the upper surface and the lower surface; and cutting edges formed by the upper surface and the side surfaces,
wherein a first cutting edge among the cutting edges is inclined downward from one side to the other side,
a major side surface among the side surfaces comprises a first major side surface connected to the upper surface so as to constitute the first cutting edge, and a second major side surface connected to the first major side surface and the lower surface, wherein the first major side surface has a negative surface, and the second major side surface has a positive surface, and
a minor side surface among the side surfaces comprises a first minor side surface connected to the upper surface so as to constitute a second cutting edge, a second minor side surface connected to the first minor side surface and the lower surface, and a third minor side surface connected to the upper surface and the lower surface, wherein the first minor side surface has a positive surface, the second minor side surface has a positive surface or a negative surface, and the third minor side surface has a negative surface.

2. The cutting insert of claim 1, wherein, when the second minor side surface has the positive surface, the first minor side surface is formed at a positive angle that is less than the positive angle of the first minor side surface.

3. The cutting insert of claim 1, wherein the first major side surface and the third minor side surface serve as a mounting surface when the cutting insert is mounted on a cutting tool.

4. The cutting insert of claim 1, wherein, when seen on a plan view, the cutting insert has upper and lower portions divided into 180-degree rotational symmetry with reference to a center of the fastening hole by a first centerline passing through the center of the fastening hole in a transversal direction.

5. The cutting insert of claim 1, wherein, when seen on a plan view, the cutting insert has left and right portions divided into 180-degree rotational symmetry with reference to a center of the fastening hole by a second centerline passing through the center of the fastening hole in a longitudinal direction.

6. The cutting insert of claim 1, wherein the one side is a high portion, and the other side is a low portion, and the upper surface is inclined from the high portion toward the fastening hole.

7. The cutting insert of claim 1, wherein an angle of inclination of the first cutting edge is 3 degrees or more and 20 degrees or less.

8. A cutting tool with the cutting insert as set forth in claim 1 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

9. A cutting tool with the cutting insert as set forth in claim 1 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

10. A cutting tool with the cutting insert as set forth in claim 2 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

11. A cutting tool with the cutting insert as set forth in claim 3 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

12. A cutting tool with the cutting insert as set forth in claim 4 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

13. A cutting tool with the cutting insert as set forth in claim 5 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

14. A cutting tool with the cutting insert as set forth in claim 6 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

15. A cutting tool with the cutting insert as set forth in claim 7 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

16. The cutting tool of claim 8, wherein the first major side surface sheet surface, the third minor side surface sheet surface, and the lower surface sheet surface are flat surfaces.

17. The cutting tool of claim 9, wherein the first major side surface sheet surface, the third minor side surface sheet surface, and the lower surface sheet surface are flat surfaces.

18. A cutting insert, comprising:
an upper surface; a lower surface having a flat surface; a fastening hole penetrating the upper surface and the lower surface; side surfaces each connecting to the upper surface and the lower surface; and cutting edges formed by the upper surface and the side surfaces,
wherein a first cutting edge among the cutting edges is inclined downward from one side to the other side,
a major side surface among the side surfaces comprises a first major side surface connected to the upper surface so as to constitute the first cutting edge, and a second major side surface connected to the first major side surface and the lower surface, wherein the first major side surface has a negative surface, and the second major side surface has a positive surface, and
a minor side surface among the side surfaces comprises a first minor side surface connected to the upper surface so as to constitute a second cutting edge, and a third minor side surface connected to the upper surface and the lower surface, wherein the first minor side surface has a positive surface, and the third minor side surface has a negative surface,
wherein the one side is a high portion, and the other side is a low portion, and the upper surface is inclined from the high portion toward the fastening hole, and
wherein the upper surface is composed of non-flat surface only.

19. A cutting tool with the cutting insert as set forth in claim 18 mounted thereon,
wherein the cutting tool is provided with a mounting sheet surface for mounting with the cutting insert, and
the mounting sheet surface comprises
a first major side surface sheet surface, a third minor side surface sheet surface, and a lower surface sheet surface, each being in contact with, and having corresponding shapes to the first major side surface, the third minor side surface, and the lower surface.

\* \* \* \* \*